(12) United States Patent
Ludwig et al.

(10) Patent No.: US 11,341,394 B2
(45) Date of Patent: May 24, 2022

(54) DIAGNOSIS OF NEURAL NETWORK

(71) Applicant: International Business Machines Corporation, Armonk, NY (US)

(72) Inventors: Heiko H. Ludwig, San Francisco, CA (US); Hogun Park, West Lafayette, IN (US); Mu Qiao, Belmont, CA (US); Peifeng Yin, San Jose, CA (US); Shubhi Asthana, Santa Clara, CA (US); Shun Jiang, San Jose, CA (US); Sunhwan Lee, San Mateo, CA (US)

(73) Assignee: International Business Machines Corporation, Armonk, NY (US)

(*) Notice: Subject to any disclaimer, the term of this patent is extended or adjusted under 35 U.S.C. 154(b) by 442 days.

(21) Appl. No.: 16/520,851

(22) Filed: Jul. 24, 2019

(65) Prior Publication Data

US 2021/0027133 A1 Jan. 28, 2021

(51) Int. Cl.
| | |
|---|---|
| H04N 21/81 | (2011.01) |
| G06Q 30/02 | (2012.01) |
| G06N 5/04 | (2006.01) |
| G06F 17/27 | (2006.01) |
| G06N 3/04 | (2006.01) |
| G06F 16/901 | (2019.01) |
| G06K 9/62 | (2022.01) |

(52) U.S. Cl.
CPC ......... *G06N 3/04* (2013.01); *G06F 16/9024* (2019.01); *G06K 9/6267* (2013.01); *G06N 5/045* (2013.01)

(58) Field of Classification Search
CPC .......... G06N 3/04; G06N 5/045; G06N 3/048; G06N 3/0427; G06N 3/105; G06F 16/9024; G06K 9/6267; G06K 9/6273
USPC ...................................................... 706/1–62
See application file for complete search history.

(56) References Cited

U.S. PATENT DOCUMENTS

| | | | |
|---|---|---|---|
| 9,424,533 B1 | 8/2016 | Zadeh | |
| 2012/0017232 A1* | 1/2012 | Hoffberg | ................. F24F 11/30 725/13 |
| 2017/0034591 A1* | 2/2017 | Ray | ..................... G06Q 30/0269 |
| 2017/0206691 A1* | 7/2017 | Harrises | ............. G02B 27/0172 |
| 2019/0114549 A1* | 4/2019 | Olsher | ................. G06Q 10/025 |

OTHER PUBLICATIONS

Iyer, R., et al., Transparency and Explanation in Deep Reinforcement Learning Neural Networks, Association for the Advancement of Artificial Intelligence, arXiv:1809.06061, Sep. 17, 2018.

(Continued)

*Primary Examiner* — Brandon S Cole
(74) *Attorney, Agent, or Firm* — Lieberman & Brandsdorfer, LLC

(57) ABSTRACT

Embodiments relate to systematic explanation of neural model behavior and effective deduction of its vulnerabilities. Input data is received for the neural model and applied to the model to generate output data. Accuracy of the output data is evaluated with respect to the neural model, and one or more neural model vulnerabilities are identified that correspond to the output data accuracy. An explanation of the output data and the identified one or more vulnerabilities is generated, wherein the explanation serves as an indicator of alignment of the input data with the output data.

18 Claims, 12 Drawing Sheets

(56) References Cited

OTHER PUBLICATIONS

Becker, S. et al., Interpreting and Explaining Deep Neural Networks for Classification of Audio Signals, arXiv:1807.03418, Jul. 9, 2018.
Grégoire Montavon, On Layer-Wise Representations in Deep Neural Networks, Thesis Document, Technical University of Berlin, Oct. 2013.
Ribeiro, M. T., et al., "Why Should I Trust You?" Explaining the Predictions of Any Classifier, International Conference on Knowledge Discovery and Data Mining, 2016.
Dhurandhar, A., et al., Explanations based on the Missing: Towards Contrastive Explanation with Pertinent Negatives, 32nd Conference on Neural Information Processing Systems (NeurIPS 2018).

* cited by examiner

DIAGNOSIS OF NEURAL NETWORK

BACKGROUND

The present embodiments relate to evaluating a deep neural network. More specifically, the embodiments relate to systematic explanation of model behavior and effective deduction of its vulnerability. More specifically, the embodiments are directed to application of backward deduction to the neural network to provide an explanation at each layer in the form of exemplary input. The explanation of the neural network provides an intuitive explanation, and serves as a tool to diagnose the model and detect any potential vulnerability.

SUMMARY

The embodiments include a system, computer program product, and method for dynamically assessing reliability.

In one aspect, a system is provided for use with an artificial intelligence (AI) platform to evaluate a neural model. The processing unit is operatively coupled to the memory and is in communication with the AI platform, which is embedded tool in the form of a data manager and an evaluation manager. The data manager functions to receive input data for the neural model and apply the input data to the model to generate output data. The evaluation manager functions to evaluate the accuracy of the output data with respect to the neural model and identify one or more neural model vulnerabilities corresponding to the output data accuracy. The evaluation manager further functions to generate an explanation of the output data and the identified one or more vulnerabilities, wherein the explanation is an indicator of alignment of the input data with the output data.

In another aspect, a computer program product is provided to monitor and evaluate a neural model. The computer program product includes a computer readable storage medium having program code embodied therewith, with the program code executable by a processor to evaluate a neural model. Program code is provided to apply input data to the model, with the model generating output data. Program code evaluates accuracy of the output data with respect to the neural model, and further identifies one or more neural model vulnerabilities corresponding to accuracy of the output data. Program code generates an explanation of the output data and the identified one or more vulnerabilities, with the explanation including an indicator of alignment of the input data with the output data.

In yet another aspect, a method is provided for evaluating a neural model. Input data is received and applied to the model to generate output data. Accuracy of the output data is evaluated with respect to the neural model, and one or more neural model vulnerabilities that correspond to the output data accuracy are identified. An explanation of the output data and the identified one or more vulnerabilities is generated. The explanation is an indicator of alignment of the input data with the output data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
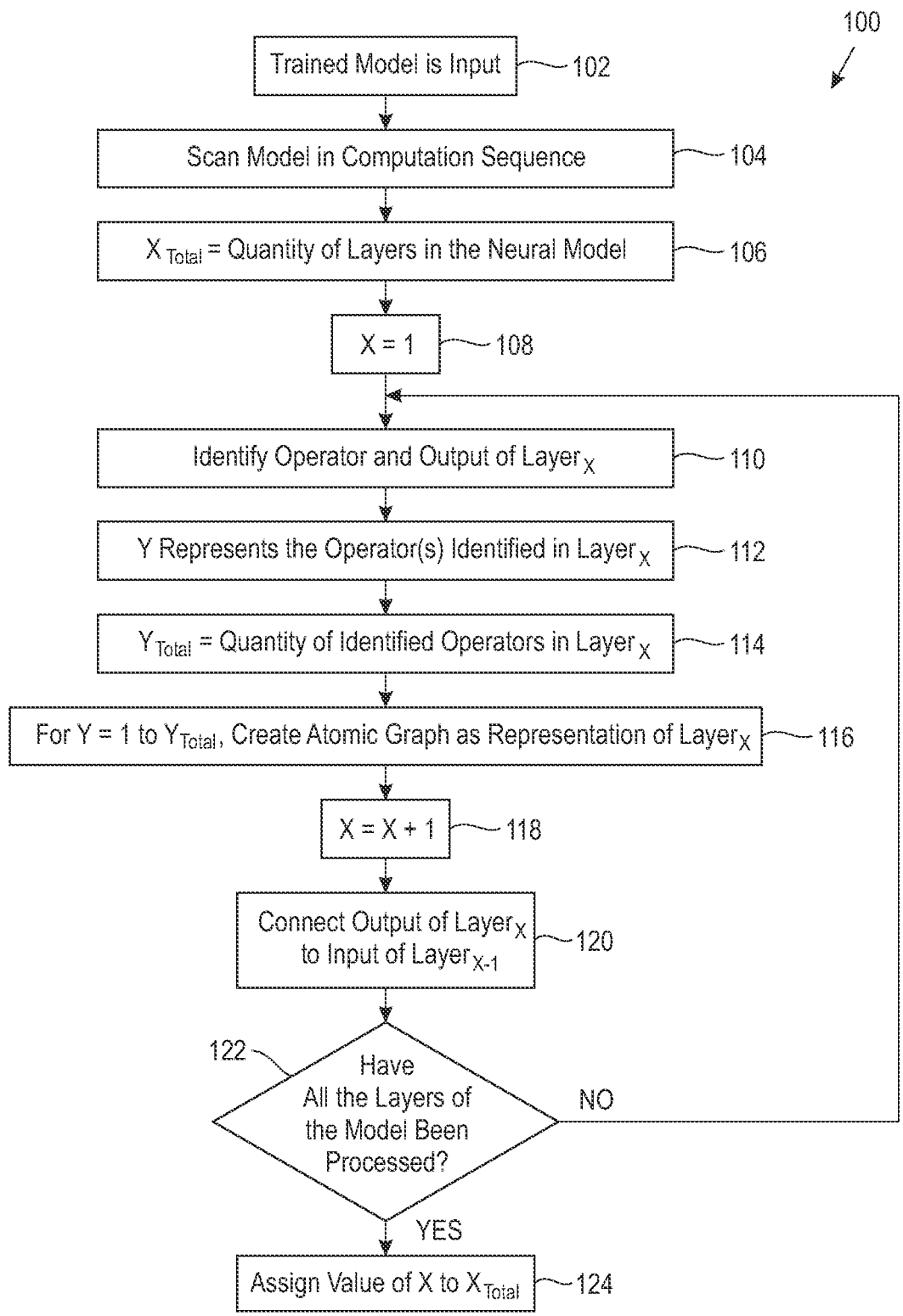
FIG. 1 depicts a flow chart illustrating a general process for evaluating a neural network.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificially intelligent computer systems, natural language systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

AI, especially deep learning, has made significant progress in a lot of areas, such as autonomous driving, machine translation, and speech recognition, with profound impact on our society. However, deep learning models, or deep neural networks, are usually treated as black boxes, suffering from the lack of interpretability. Explainable AI (XAI) is essential if users want to understand the decision making process, appropriately trust the model, and detect any potential vulnerability. The ability to explain or provide an explanation of the model(s) is tightly coupled with down-stream tasks, such as increasing fairness, enhancing safety, accelerating discovery, and improving productivity.

Interpretation is the process of giving explanations to humans. As shown and described herein, the process and system demonstrate provision of an explanation after building a model, i.e., the interpretability for an already-trained model. The method and system provided herein and demonstrated in the associated drawing figures systematically explain the neural network via backward deduction, which back tracks the architecture of the subject model and provides explanation at each layer in the form of exemplary input. The explanation of the neural network provides an intuitive explanation, and serves as a tool to diagnose the model and detect any potential vulnerability.

The running of a neural network is a sequence of layer-based computations. The process shown and described herein is directed at a systematic explanation of a model representing the neural network, and specifically model behavior and effective detection of its vulnerability. A deduction framework is created and utilized to diagnose the neural network. The deduction starts with an initial output constraint on a final layer, and deducts corresponding input ranges. Newly deducted input ranges of a current layer serve as the output constraint of the next layer. The framework stops at the first layer with a set of deducted input data ranges.

The prediction process of neural networks can be treated as a pipeline computation of different layers. Examples of the layers include, but are not limited to, affine projection, sigmoid, hyperbolic, relu, and softmax. The affine projection consists of a linear mapping and a shift. Given an input vector, $x \in \mathbb{R}^{d1}$, the affine projection $f_{\mathit{aff}}: \mathbb{R}^{d1} \to \mathbb{R}^{d2}$ with matrix $w \in \mathbb{R}^{d1 \times d2}$ and bias vector $b \in \mathbb{R}^{d2}$ is defined as:

$$f_{\mathit{aff}}(x) = w^T x + b \quad \text{(equation 1)}$$

The sigmoid layer, σ, and the hyperbolic layer, tan h, are two similar non-linear activation functions with exponential decay. The formal definitions are given as follows:

$$\sigma(x) = \frac{1}{1 + e^{-x}} \quad \text{(equation 2)}$$

$$\tanh(x) = \frac{e^x - e^{-x}}{e^x + e^{-x}} \quad \text{(equation 3)}$$

The relu (Rectified Linear Unit) layer is a cut-off layer that only allows positive input. The relu layer is defined as:

$$relu(x) = \begin{cases} x & \text{if } x > 0 \\ 0 & \text{otherwise} \end{cases} \quad \text{(equation 4)}$$

The softmax layer is a normalization function that converts an unconstrained vector to a probability distribution. Given an input, x, we denote the ith element as x[i], and the corresponding output as:

$$\text{softmax}(x)[i] = \frac{e^{x[i]}}{\sum_j e^{x[j]}} \quad \text{(equation 5)}$$

With atomic layers clearly defined, a multi-layer neural network can be treated as a series of these concatenated functions. $F_L$ represents a L-layered neural network and $f_l$ is the $l^{th}$ layer function, with the computation process represented as:

$$F_L(x) = f_L(f_{L-1}(\ldots f_1(x))) = f_L \circ f_{L-1} \circ \ldots \circ f_1(x) \quad \text{(equation 6)}$$

where the $f_l$ is one of the functions defined in Equations (1) to (5).

The process of diagnosing the neural network takes place in reverse order to diagnose each layer with its corresponding algorithm. Given a pre-trained neural network for classification, the diagnosis is to find what input would make the model classify the instances to be a particular class. The data range, r, is used to described input characteristics. The data range, r=[$x_{min}$, $x_{max}$] is represented by two vectors, $x_{min}$, $x_{max} \in \mathbb{R}^d$ where $\forall 1 \leq k \leq d$, $x_{min}[k] \leq x_{max}[k]$. The data range is a hyper rectangle in d-dimensional vector space. The goal is to find a set of data ranges, S, such that all data points falling on one of the ranges would be classified into a particular class, e.g. S={$r_1$, ... $r_n$}. Such that $\forall x \in \mathbb{R}^d$, if $\exists r \in S$ and $x \in r$, then $v_{min} \leq F(x) \leq 1$. In one embodiment, the lower bound of probability, $v_{min}$, depends on a desired confidence of the found data ranges, where a larger value indicates a higher confidence level of the model.

The prediction process of a neural network is essentially a concatenation of functions. The diagnosis is a recursive process that takes place in a backward order, where the found data ranges in larger l are the output constraint for layer l-1. The process of finding data ranges is referred to herein as deduction. For discussion purposes, the deduction process is directed at an affine projection, although it is understood that the deduction process can be applied to sigmoid, hyperbolic, relu, and softmax layer.

The diagnosis is to find a set of data ranges such that all data points falling in one of these ranges would be classified into a particular class. Given a pre-training neural network, F, for multi-label classification and a target label index, j, the goal is to find a set of data ranges S={$r_1$, ..., $r_n$} such that $\forall x \in \mathbb{R}^d$, if $\exists r \in S$ and $x \in r$, then $v_{min} \leq F(x) \leq 1$. The lower bound of the probability $v_{min}$ depends on the desired confidence of the found data ranges, where larger value indicates higher confidence levels of the model.

Referring to FIG. 1, a flow chart (100) is provided to illustrate a general process for evaluating a neural network. It is understood in the art that the neural network can be de-composed into an atomic graph, e.g. structure. A trained model, and in one embodiment training data, are provided as input (102). The model is scanned in computation sequence (104). It is understood in the art that given the neural mode, the quantity of layers is known. The variable $X_{Total}$ is assigned to the quantity of layers in the neural model (106). A layer counting variable, X, is initialized (108). For layer$_X$, the operator and the output are identified (110). The identification at step (110) exemplifies what the input should look like given the output and the operator. The variable Y represents the operator(s) identified in layer$_X$ (112), and the quantity of identified operators in layer$_X$ is assigned to the variable $Y_{Total}$ (114). For each identified operator, Y, an atomic graph is created as a representation of the layer, layer$_X$, (116). Accordingly, for each layer, the operators are identified, and for each identified operator in the layer, an atomic graph is created.

Following step (116), the layer counting variable is incremented (118) and the output of layer$_{X-1}$ is connected to the input of layer$_X$ (120), so that the parent graph, e.g. graph$_{X-1}$, becomes the input to the child graph, e.g. graph$_X$. Following step (120), it is determined if all of the layers of the model have been processed (122). A negative response is followed by a return to step (110), and a positive response is followed by assigning the value of X, identifying the quantity of layers in the neural network, to the variable $X_{Total}$ (124). Accordingly, the neural network is subject to processing to create an association between the input and output of sequentially positioned layers.

Figure 2:
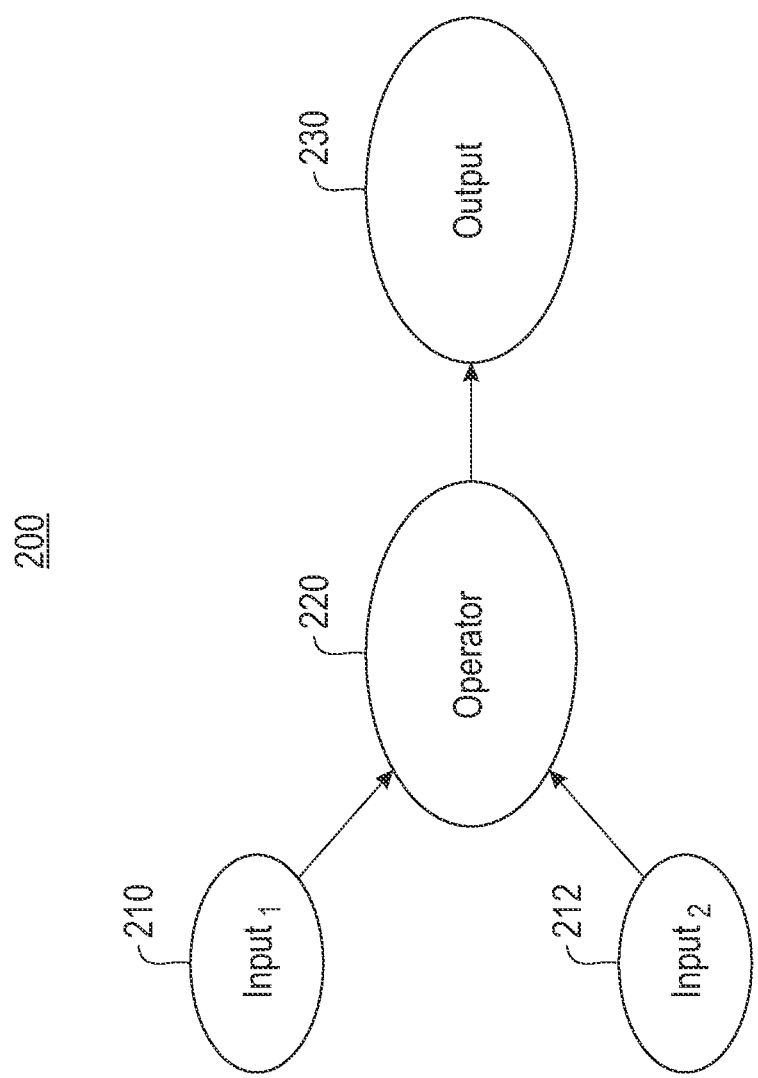
FIG. 2 depicts a block diagram to illustrate an example atomic structure within the neural model.

Referring to FIG. 2, a block diagram (200) is provided to illustrate an example atomic structure within the neural model. As shown, an operator (220) is operatively coupled to output (230) and input (210) and (212). In one embodiment, the atomic structure is a representation of an innermost layer of the neural model. Accordingly, as shown and described in FIG. 1, the operator (220) and the output (230) are provided, e.g. given, and the input (210) and (212) are ascertained from the operator (220) and the output (230).

Figure 3:
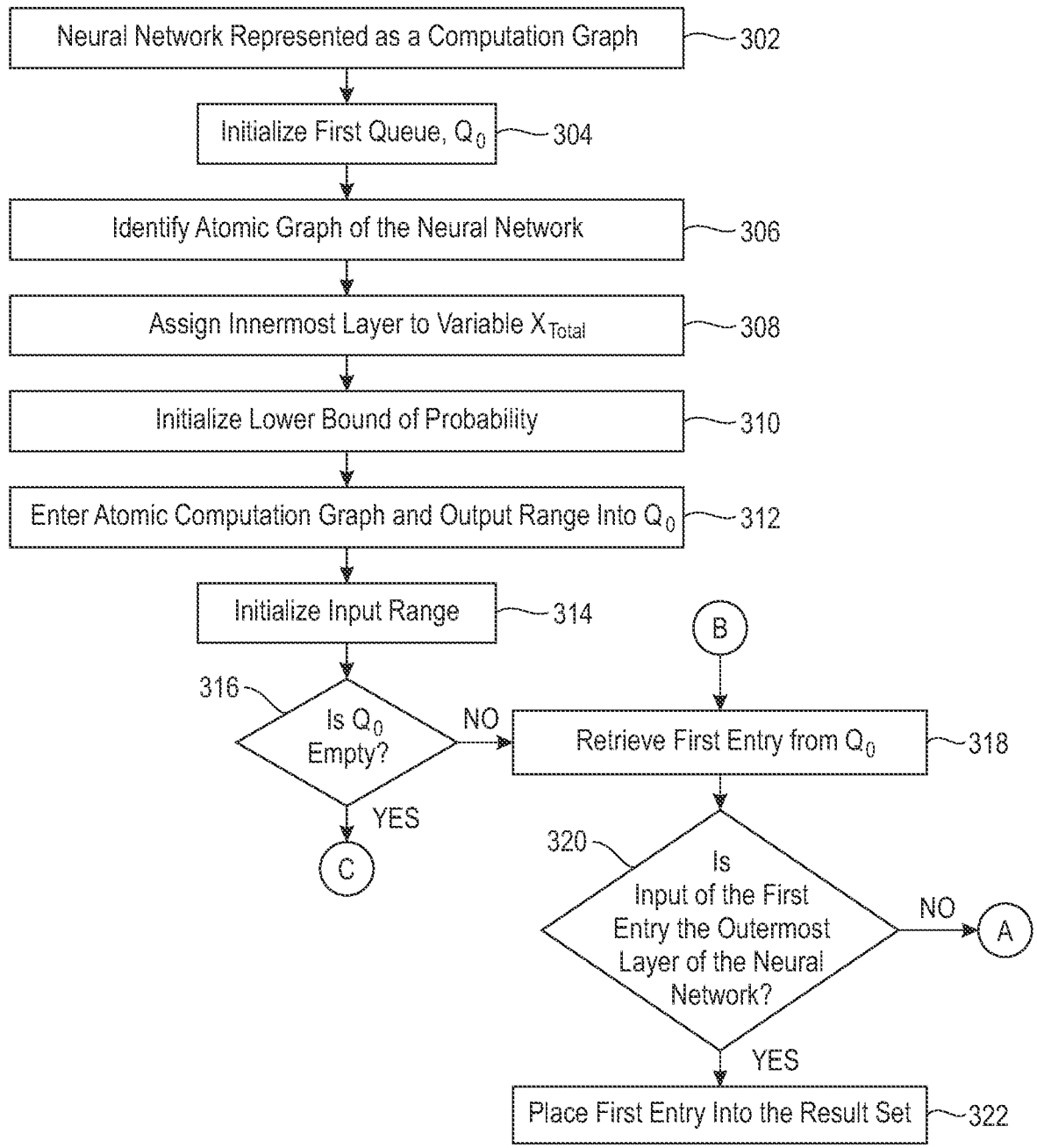
FIG. 3 depicts a flow chart illustrating a process of running a deduction engine over the neural network to identify a set of data ranges that correspond and support an output range.
Figure 3:
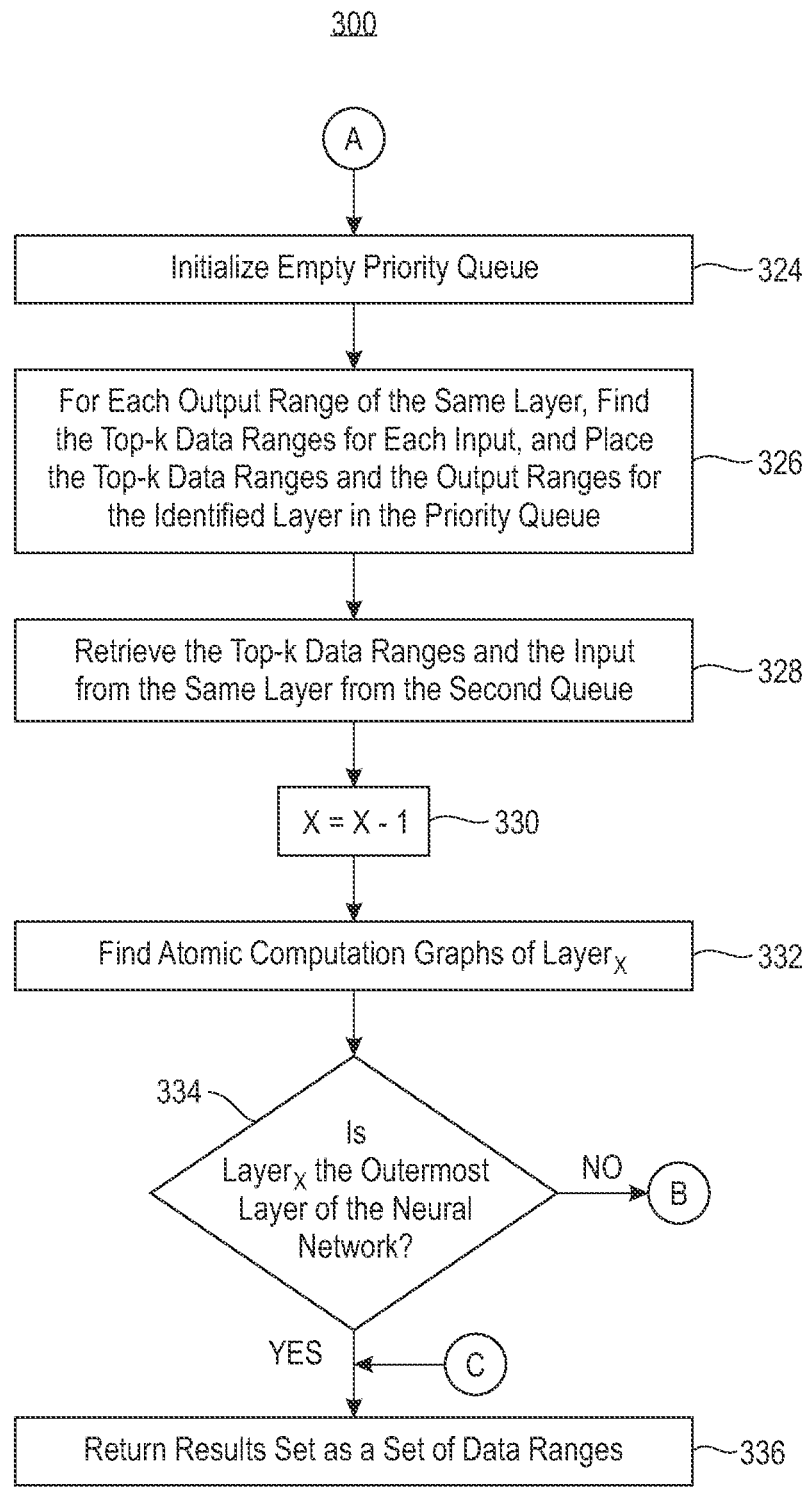

Referring to FIG. 3, a flow chart (300) is provided to illustrate a process of running a deduction engine over the neural network to identify a set of data ranges that correspond and support an output range. The set of ranges are referred to herein as top-k data ranges. Input is provided in the form a neural network represented as a computation graph (302). See FIG. 2 for an example basic computation graph. It is understood in the art that the neural network is an arrangement and layering of a plurality of computation graphs. An empty data structure, hereinafter referred to as a first queue, is initialized (304). The atomic graph of the neural network, e.g. the innermost layer of the neural network, is identified wherein the final prediction, e.g. final result, is the output (306). The innermost layer of the neural network, as ascertained in FIG. 1, is assigned to the variable, e.g. $X_{Total}$, and a corresponding layer counting variable is assigned to represent the quantity of layers in the network, e.g. $X_{Total}$ (308). A lower bound of probability is initialized (310). In one embodiment, the lower bound may be a user specified value based on requirements of input and output. The lower bound is a constraint on final output. Following step (310), the atomic computation graph and the output range are entered into the first queue (312). The deduction engine is directed at computing an input range that will lead to or support the output range.

To support the deduction engine, an empty set of result data, e.g. input range, is subject to initialization (314). It is determined if the first queue is empty (316). A negative response is followed by retrieving the first entry, e.g. atomic graph and output range, from the queue (318). It is then determined if the input of the retrieved first entry is the outermost layer of the neural network (320). A positive response to the determination at step (320) is followed by placing the first entry into the result set (322). However, a negative response to the determination at step (320) is followed by initializing an empty priority queue, e.g. second queue, (324), and for each output range of the same layer, finding the top-k data ranges, or in one embodiment a user specified threshold, for each input, and placing the top-k data ranges and the output ranges for the identified layer into the second queue (326). See FIG. 4 below for a detailed description of the top-k data ranges. Following step (326), the top-k data ranges and the input from the same layer are retrieved from the second queue (328). The layer counting variable, X, is decreased, to identify the next layer of the neural network (330), and the atomic computation graph of the corresponding layer, e.g. the upstream atomic computation graph of layer$_X$, is found (332). It is then determined if layer$_X$ is the outermost layer of the neural network (334). The first queue will be empty at the outermost layer of the neural network. A negative response to the determination at step (334) is followed by a return to step (318). However, a positive response to the determination at steps (334) or (316), or following step (322), is followed by returning the result set, also referred to herein as a set of data ranges. Accordingly, the output from the process shown herein is a set of data ranges that correspond and support an output range for the innermost layer of the neural network.

Figure 4:
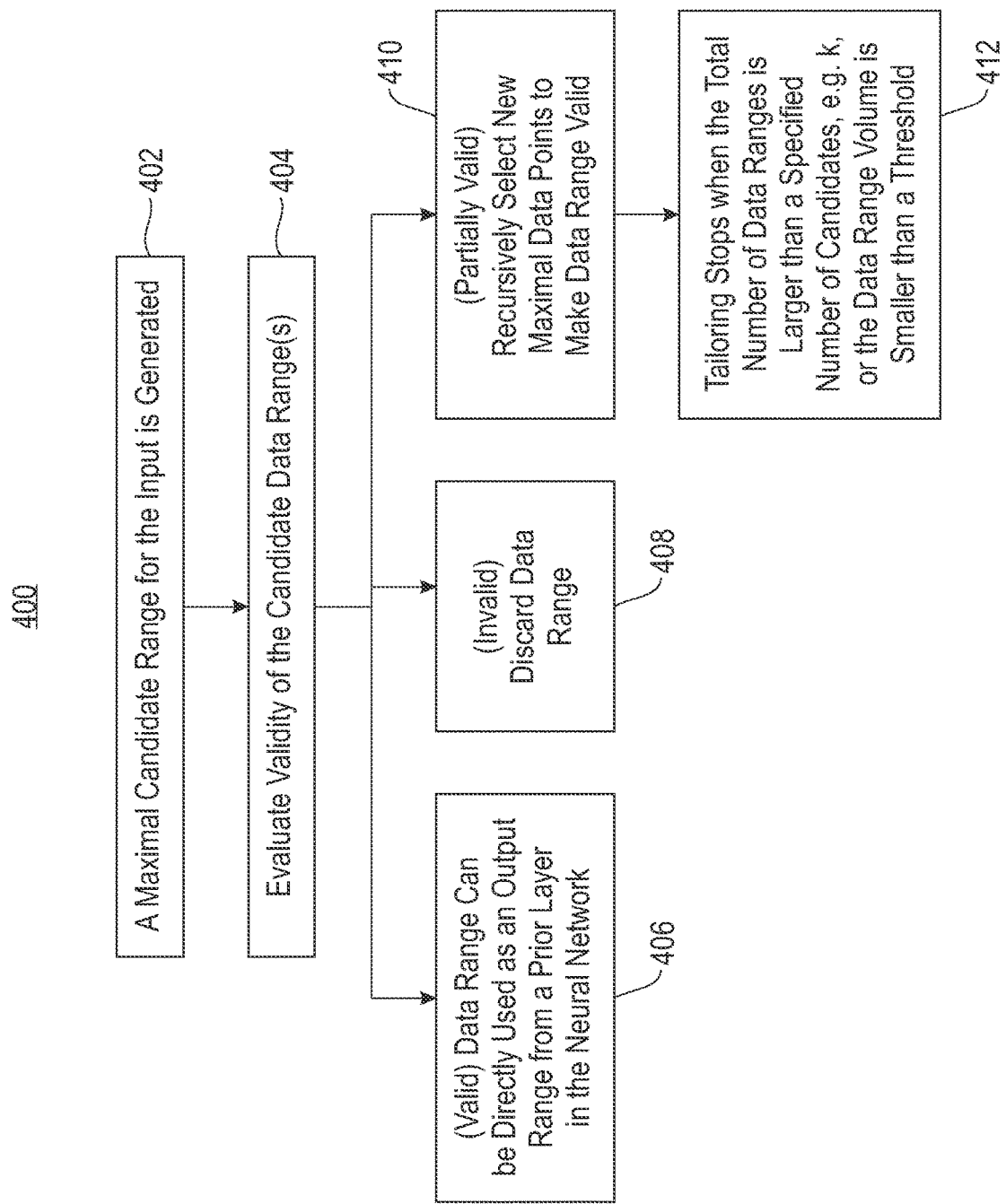
FIG. 4 depicts a flow chart illustrating a process for identifying the top-k data ranges. Each layer of the neural network has an atomic computation graph.

Referring to FIG. 4, a flow chart (400) is provided to illustrate a process for identifying the top-k data ranges. Each layer of the neural network has an atomic computation graph. An output range for each layer of the neural network is identified, as shown and described in FIG. 3. In one embodiment, the output range for each layer is represented in the first queue, which stores all the atomic computation graphs corresponding output range. The top-k data ranges for the input that are ascertained herein is a set of data ranges or data points that lead to and support the identified or ascertained output range. A maximal candidate range for the input that potentially contains all the data points, e.g. the minimum and maximum of the input, is generated (402). In one embodiment, the maximal candidate range is used from a previous activation layer or raw data input boundaries. The validity of the candidate data ranges is subject to evaluation with respect to validity, and more specifically satisfying the output range constraint identified in the first queue (404). The validity evaluation checks whether a candidate range is valid to serve as the output range for the last layer, e.g. the previously evaluated layer.

As described herein, a data range is a hyper rectangle. All points contained in a data range are bounded by the corner points of the hyper rectangle. For validity assessment, focus is directed to the corner points. The data range may be valid, invalid, or partially valid. If at step (404) it is determined that the data range is valid, then the data range can be directly used as an output range from a prior layer in the neural network (406), as shown and described in FIG. 3. A valid data range, r, with regards to an upper bound, $v_{max}$, is the one whose all contained data points, $\forall x \in r$ satisfy $w \cdot x + b \leq v_{max}$. A corner point is defined as follows: given a d-dimension data range $r=(x_{min}, x_{max})$, its corner point, $x_c \in \mathbb{R}^d$ is a data point in the same vector space and its element value is either from minimum or maximal bound, i.e. $\forall i \in \{1, 2, \ldots, d\}$, $x_c[i] \in \{x_{min}[i], x_{max}[i]\}$.

Figure 5:
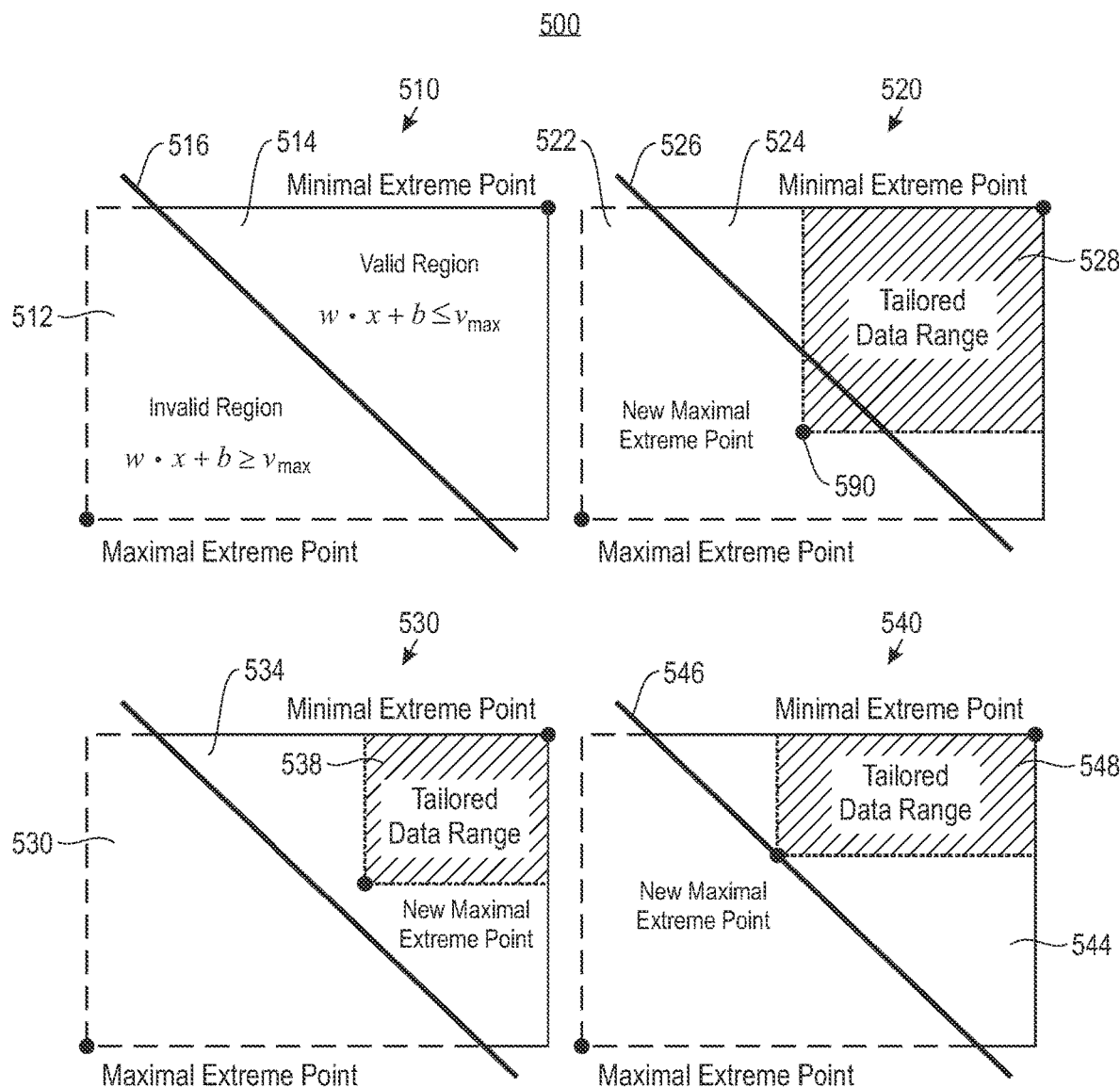
FIG. 5 depicts a block diagram to illustrate tailoring a data range by finding a new maximal extreme point.

If at step (404) it is determined that the data range is invalid then the data range is discarded (408). However, if the data range is partially valid, then the data range is subject to tailoring by recursively selecting new maximal data points to make the data range valid (410). The goal is to tailor a partially valid data range to a valid set of smaller data ranges. Geometrically, a partially valid data range is a hyper rectangle intercepted by a hyper plane. Referring to FIG. 5, a block diagram (500) is provided to illustrate tailoring a data range by finding a new maximal extreme point. An original data range is shown at (510) with an invalid region (512) and a valid data region (514) separated by hyperplane (516). At (520) selection of an invalid data region (522) is shown with a new maximal extreme point (590), and a tailored data range (528) that extends across the hyperplane (526) spanning the valid data region (524) and the invalid data region (522). Selection of in the valid data region is shown at (530) with the tailored data range (538) residing exclusively in the valid data region (534). Referring to (540), selection on the hyperplane (546) is shown, with the tailored data range (548) residing in the valid data region (544).

Tailoring a partially valid data range can be formulated as finding a new maximal extreme point to form a different data range with an original minimal extreme point. When a maximal extreme point is selected on the plane, the formed new valid data range cuts the remaining part into a plurality of partially valid regions. There are d sub-ranges in a d-dimension space. The tailoring at step (410) includes selecting a maximal extreme point on an intersection between a hyper plane and the valid range so that the volume of a resulted data range is maximized. The data range volume is defined as follows: given a data range $r=\{x_{min}, x_{max}\}$ in d-dimensional space, its volume is defined as the product of length in each dimension, i.e., $\Pi_{i=1}^{d} |x_{max}[i] - x_{min}[i]|$. If the total number of data ranges is larger than a specified number of candidates, e.g. k, or the data range volume is smaller than a threshold, then the tailoring stops (412). To complete the tailoring, new maximal extreme points are recursively selected for each sub-problem.

The recursive tailoring procedure identifies a weight of the hyperplane, w, an upper bound $v_{max}$, and an initial data range, $r_0$. The following is pseudo code demonstrating the recursive tailoring process:

```
1.  Procedure FRAMEWORK(w, v_max, r_0) < x ∈ r_0, w · x ≤ v_max >
2.      S ← ∅, Q ← ∅         <initialize result set and Priority Queue>
3.      Q.push(0, r_0)
4.      construct c_max0 from r_0
5.      while Stop criteria are not met ^ Q ≠ ∅ do
6.          _, r ← Q.pop( )
7.          construct c_min from r
8.          select c_max according to w, v_max, c_min, r
9.          S ← S ∪ {r'}
10.         for i ← 1, d do        <d-dimension vector space>
11.             c_min_i ← c_min
12.             c_min_i[i] ← c_max[i]
13.             construct r_i from c_min_i, c_max0
14.             score ← Rank(r_i)
15.             Q.push(score, r_i)
16.         end For
17.     end while
18.     return S
19. end procedure
```

In the while loop, a new maximal extreme point is selected for each sub-problem to form a valid data range. This step also generates d candidate data ranges by replacing the original value of $c_{min}$ with $c_{max}$ found for each dimension, where $c_{min}$ is a minimal extreme point and $c_{max}$ is a maximal extreme point. Dominance is defined as a relation between two points. Given an affine projection's weight w, for two points $x_1, x_2 \in \mathbb{R}^d$, if for every dimension $i \in \{1, 2, \ldots d\}$, sign $(w[i])^T \cdot x_1[i] \geq$ sign $(w[i])^T \cdot x_2[i]$, we define that point $x_1$ is dominated by point $x_1$ under w.

Combining the definition of minimal extreme point with dominance, all points that fall in the data range are dominated by the minimal extreme point. Given a data range, its minimal extreme point, $c_{min}$, for an affine projection is a corner point that achieves a minimal projected value, i.e. $c_{min} = \arg\min_{x \in r} w^T \cdot x + b$. Similarly, given a data range, its maximal extreme point, $c_{max}$, for an affine projection is a corner point that achieves a maximal projected value, i.e. $c_{max} = \arg\max_{x \in r} w^T \cdot x + b$. If the projected value of $c_{max}$ is no larger than the upper bound then the whole data range is valid and can be directly used as an output range for layer deduction. If the projected value of $c_{min}$ is larger than the upper bound, this suggests that the whole data range should be discarded. And, if the projected value of $c_{min}$ is no larger than the upper bound but not for $c_{max}$, then the data range is partially valid and needs to be tailored. The algorithm concludes and stops with returning a set of valid data ranges, S. Selection of the candidate extreme point should satisfy two conditions, including: on the hyper plane, and dominated by the minimal extreme point.

The following is pseudo code for selection of a new maximal extreme point:

```
1. procedure SelectMax (w, v_max, r)
2.   c_min, c_max ← construct min/max extreme points from r
3.   A ← construct new basis according to c_min, c_max
4.   w_A ← A^T · w
5.   v_max_A ← v_max − w^T · c_min
6.   z_max ← A · (c_max, c_min)
7.   z ← 0^d, mask ← 1^d
8.   while sum(mask) >0 do 9.       z[mask] ← (v_max_A / sum(mask)) · (1 / w_A[mask])

10.      if ∀1 ≤ i ≤ d, z[i] ≤ z_max[i] then
11.          break
12.      end if
13.      v_max_A ← v_max_A − w_A[z > z_max]^T · z_max [z > z_max]
14.      mask [z > z_max] ← 0       <variable become constants>
15.      z [z > z_max] ← z_max [z > z_max]
16.  end while
17.  return A^{−1} · z + c_min
18. end procedure
```

As shown, the process first constructs a new axis and converts an original problem to simpler form, see lines 3-6. To solve the optimization problem, i.e. identify the valid data range that achieves maximal volume, the algorithm starts with d variables, see line 7. The optimal solution is provided in line 9. In the while loop, every time a solution is obtained, it checks whether it is within the data range. If so, the loop is stopped. Otherwise, the violated dimension is set to be non-variable, see line 14, and revised to be a legally maximal value, see line 15. Accordingly, as demonstrated, the process converts the obtained complete solution back to the original basis, which is return, see line 17.

Figure 6:
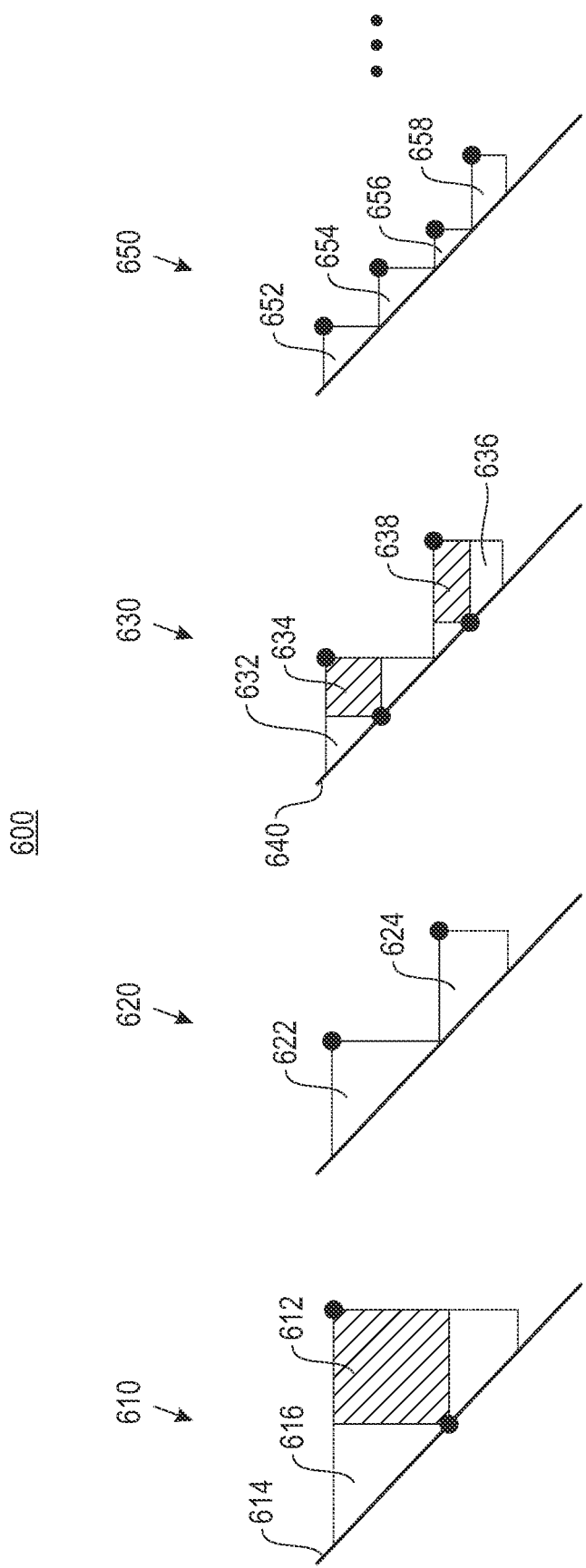
FIG. 6 depicts a block diagram to illustrate tailoring as an infinitely recursive problem.

Referring to FIG. 6, a block diagram (600) is provided to illustrate tailoring as an infinitely recursive problem. As shown at (610), a tailored data range (612) is shown on the hyperplane (614) and residing in the valid data region (616). When a maximal extreme point is selected on the hyperplane, the new formed valid data range cuts the remaining parts into several partially valid regions, as shown at (620) with valid regions (622) and (624). A tailored data range is then formed for each of the formed new valid regions. As shown at (630), there are two tailored data ranges, including tailored data range (634) in valid region (632) and tailored data range (638) in valid region (636). Similar to the illustration at (610), each of the tailored data ranges (634) and (638) reside in their respective valid data regions (632) and (636), respectively, and on hyperplane (640). When the maximal extreme point is selected on the hyperplane, as shown at (630), the process continues with segmentation and formation of new valid data ranges. As shown at (650), the formed new valid data range cuts the remaining parts into several partially valid regions, shown herein as (652), (654), (656), and (658). Accordingly, the graphic illustration shown herein demonstrates the geometric tailoring process.

As shown and described herein, the processes and system is directed at formulating and identifying an explanation of a built neural network, i.e. interpretability for an already trained model. The neural network is systematically analyzed and explained via a backward deduction process, which back tracks the architecture of the neural model and provides an explanation at each layer in the form of exemplary input. Accordingly, the deduction effectively provides a diagnosis of the model and facilitates detection of a potential vulnerability.

There are several advantages associated with the backward deduction. For example, it is understood that the neural network subject to evaluation has a corresponding classification. The deduction process shown herein, the classification of the model is subject to tests with specific data, with focused data from the deduction used to explain the model in the form of exemplary input.

A first usecase is directed at health care and assisting with a medical diagnosis. Input to the neural network is in the form of feature vectors consisting of patient information, such as age, gender, blood pressure, temperature, blood test result data, and other symptoms. Output from the neural network is a treatment recommendation. Through the backward deduction process shown and described in FIGS. 1-4, an explanation is obtained in the form of exemplary input. For example, if the input patient information falls into the following ranges: age [45-55], gender [female], blood pressure [150-165], blood test index$_1$ [val$_1$, val$_2$], symptom$_1$ [cough], the output will be treatment recommendation$_1$, such as administration of medication.

A second usecase is directed at understanding navigation decisions of machine learning models in self-driving vehicles or advanced driver-assistance systems. Input to the neural networks is an image, e.g., a current scene captured by the camera. Output of the neural network is a wheel steering angle. The backward deduction method as shown and described in FIGS. 1-4 provides an explanation in the form of an exemplary image. For example, if the input image looks like this exemplary image, the wheel steering angle is 30. Through this explanation, we can understand that what kind of input data can lead to a particular decision.

The proposed explanation method can also be applied to detect vulnerability of a trained neural network. For example, in the aforementioned two usecases, through the backward deduction method, input data ranges that can lead to a particular decision can be obtained. These data ranges may contain areas with no training data. In practice, they can become the potential vulnerability in the model, which can suffer from adversarial attacks. If the attacker knows that certain data range can lead to a particular decision, the attacker can maliciously modify the current data to fall into that range so that the model will make a wrong decision. For example, the attacker modifies a traffic stop sign image and makes it fall into the data range that the neural network will recognize the image as a speed limit sign. Similarly, the attacker can modify patient information and make it fall into the range that the model will make different treatment recommendations. In addition, the generated explanation, i.e., an exemplary input, for the model can be inspected. If such exemplary input looks suspicious or abnormal based on domain knowledge, it is possible that the neural network is or has been attacked.

Figure 7:
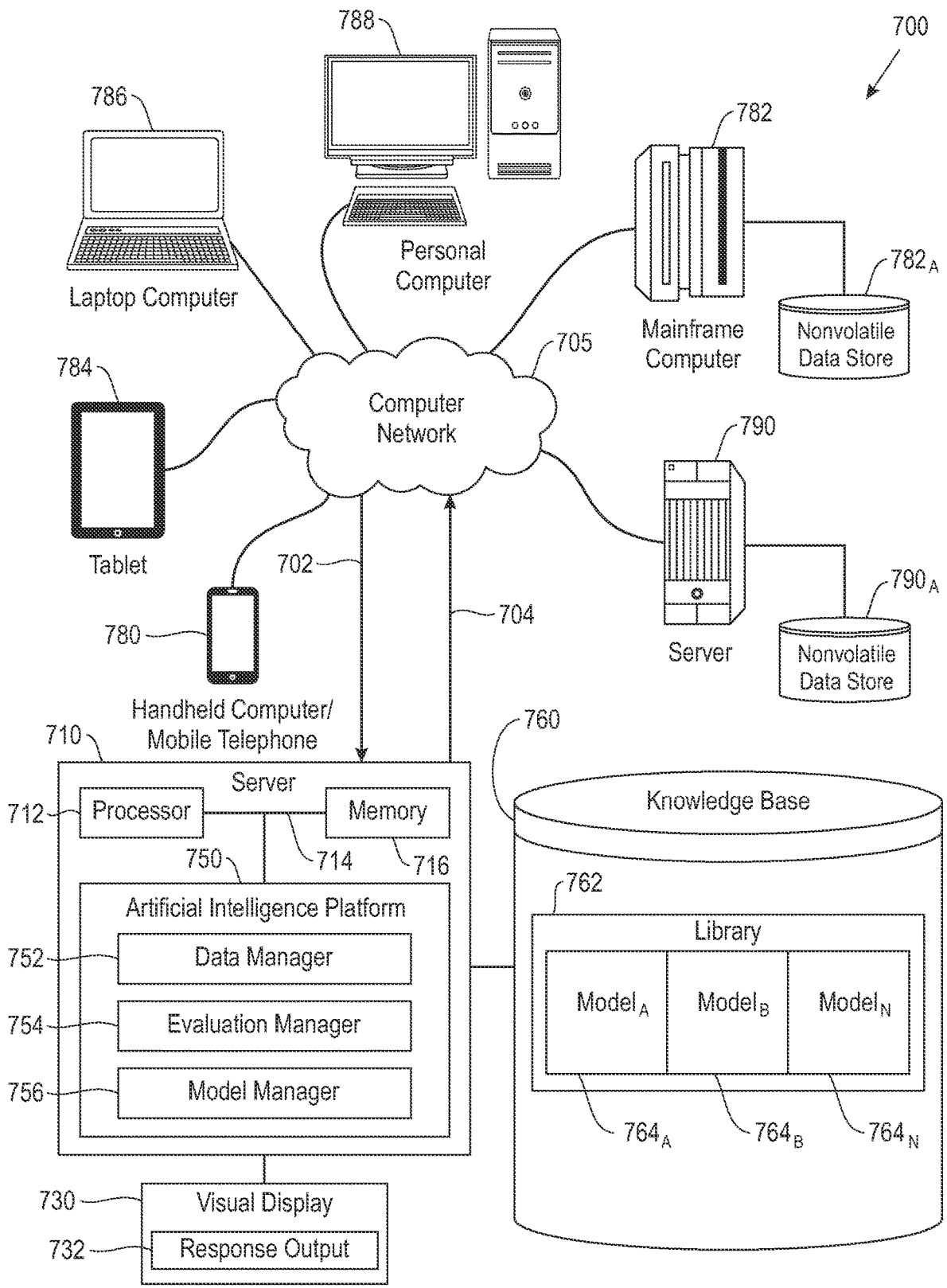
FIG. 7 depicts a system diagram illustrating a system connected in a network environment that supports reliability assessment of a neural model.

Referring to FIG. 7, a schematic diagram of a computer system (700) to support reliability assessment of a neural model is depicted. As shown, a server (710) is provided in communication with a plurality of computing devices (780), (782), (784), (786), (788), and (790) across a network connection (705). The server (710) is configured with a processing unit (712) in communication with memory (716) across a bus (714). The server (710) is shown with an artificial intelligence (AI) platform (750) to evaluate source data reliability over the network (705) from one or more of the computing devices (780), (782), (784), (786), (788), and (790). More specifically, the computing devices (780), (782), (784), (786), (788), and (790) communicate with each other and with other devices or components via one or more wired and/or wireless data communication links, where each communication link may comprise one or more of wires, routers, switches, transmitters, receivers, or the like. In this networked arrangement, the server (710) and the network connection (705) enable communication detection, recognition, and resolution. Other embodiments of the server (710) may be used with components, systems, sub-systems, and/or devices other than those that are depicted herein.

The AI platform (750) is shown herein configured to receive input (702) from various sources. For example, AI platform (750) may receive input from the network (705) and leverage a data source (760), also referred to herein as a corpus or knowledge base, to create output or response content. As shown, the data source (760) is configured with a library (762), or in one embodiment with a plurality of libraries, with the library (762) including one or more deep neural networks, referred to herein as neural models, including $model_A$ ($764_A$), $model_B$ ($764_B$), and $model_N$ ($764_N$). In one embodiment, the library (762) may include a reduced quantity of models or an enlarged quantity of models. Similarly, in one embodiment, the libraries in the data source (760) may be organized by common subjects or themes, although this is not a requirement. Models populated into the library may be from similar or dissimilar sources.

The AI platform (750) is provided with tools to apply deduction to explain a corresponding or identified neural model. As shown and described herein, one or more of the models is subject to processing to assess reliability of the model, and in one embodiment to assess or identify a vulnerability associated with the model. The various computing devices (780), (782), (784), (786), (788), and (790) in communication with the network (705) may include access points for the models of the data source (760). The AI platform (750) functions as a platform to evaluate one or more of the models and to generate corresponding response output data (732). In one embodiment, the AI platform (750) communicates response output (732) to a visual display (730), shown herein operatively coupled to the server (710) or one or more of the computing devices (780)-(790) across network connection (704).

The network (705) may include local network connections and remote connections in various embodiments, such that the AI platform (750) may operate in environments of any size, including local and global, e.g. the Internet. The AI platform (750) serves as a front-end system that can make available a variety of knowledge extracted from or represented in documents, network accessible sources and/or structured data sources. In this manner, some processes populate the AI platform (750), with the AI platform (750) also including input interfaces to receive requests and respond accordingly.

The AI platform (750) is shown herein with several tools to support content processing and reliability assessment, including a data manager (752), an evaluation manager (754), and a model manager (756). The data manager (752) identifies a model, or in one embodiment receives an identified model. Leveraging the model, the data manager (752) receives and applies input data to the model, from which the model generates output data. The tools provided herein function to conduct an assessment analysis, which includes an alignment of the input data with the output data. The evaluation manager (754), shown herein operatively coupled to the data manager, functions to diagnose the output data generated from the model. The diagnosis includes the evaluation manager (754) to assess accuracy of the output data, such as alignment of the input and output data. As shown and described in details in FIGS. 1-4, the evaluation manager (754) applies deductive reasoning to dissect the model that is the subject of the evaluation. The deductive reasoning includes the evaluation manager (754) to scan one or more of the model layers in computational sequence, and to identify a set of input ranges aligned with desired output data. Accordingly, the evaluation manager functions to indicate accuracy of the model.

With respect to the deductive reasoning, the model manager (756), shown herein operatively coupled to the evaluation manager (754), functions to represent the neural model in the form of computation graphs. As shown and described in FIG. 2, each layer of the model includes an input, an operator, and output. For each scanned layer, the model manager (756) identifies an operator, input and output, and further functions to connect output of a parent computation graph representing a parent layer with input of a child computation graph of a child layer. The evaluation manager (754) assesses a candidate data range that serves as an output range of an external layer of the model, which includes an evaluation of validity of the candidate range, dominance of the candidate range, and coverage of the candidate range, with a proportion of training data falling into the candidate range. The candidate range is classified as valid, invalid, or partially valid. In one embodiment, the evaluation manager tailors the candidate range for a partially valid data range to a set of data ranges.

Non-alignment of the data may be a sign that the model may be compromised and have a corresponding vulnerability. The effects of the compromise may have technical applications. As shown in the usecases described herein, the effects may be in the form of a mis-diagnosis of a medical condition, or mis-communication associated with a land or air vehicle and a corresponding movement instruction. In addition to dissection of the model, the evaluation manager (754) generates an explanation of the output data, and in one embodiment provides an explanation of the selectively identified one or more vulnerabilities. The explanation, or in one embodiment the indicator, communicates alignment or non-alignment of the input data with the output data. The explanation may be communicated with the model, or in one embodiment, the output data in the form of response output (732) may include indicia to convey the explanation. Examples of the applied indicia include, but are not limited to, a value, symbol, and/or a visible property or characteristic. For example, the indicia may be an indicator associated with the model or the response output (732) indicating accuracy of the output (732) with respect to the model that generated the output. Accordingly, the output (732) functions to provide an explanation of the accuracy or reliability of the model based on alignment non-alignment of the input data with the output data.

Alignment of the input data with the output data is an indication that the model is coherent. However, non-alignment of the input and output data as identified by the evaluation manager (754) is an indication that the neural model has been compromised, such as exposure to one or more vulnerabilities, e.g. attacks. Identifying that the model has been compromised is one factor. Another factor is providing an explanation of the compromise. The data manager (752) applies exemplary data to the model, and the evaluation manager (754) generates an explanation of the output data. The explanation includes a classification of the output data. In one embodiment, the explanation is conveyed as a part of the output (732). Accordingly, by generating the explanation, the evaluation manager (754) functions to provide insight and an understanding of how and where the model has been compromised.

The output data, also referred to herein as response data, may cause or suggest an adjustment of the subject model. For example, in one embodiment, the indicia applied to the response output (732) may be calibrated, with an associated calibration value reflecting a corresponding confidence value directed at reliability of the model. The confidence value is related to the strength of model. In one embodiment, the confidence value ranges from 0.1 to 1.0, with a high number within the range corresponding to strength.

In some illustrative embodiments, server (710) may be the IBM Watson® system available from International Business Machines Corporation of Armonk, N.Y., which is augmented with the mechanisms of the illustrative embodiments described hereafter. The IBM Watson® system may receive the detected electronic communication as input content (702) which it then subject to processing through a model. Based on application of the content (702) to the model, output data (732) is generated together with an explanation of the output data (732).

The data manager (752), evaluation manager (754), and the model manager (756), hereinafter referred to collectively as AI tools or AI platform tools, are shown as being embodied in or integrated within the AI platform (750) of the server (710). The AI tools may be implemented in a separate computing system (e.g., 790) that is connected across network (705) to the server (710). Wherever embodied, the AI tools function to evaluate an electronic communication(s), assess model reliability, and process the communication(s) with respect to the assessed model reliability so that a corresponding and accurate response and response content detected may be communicated as response content (732) to the identified submission(s).

Types of information handling systems that can utilize the AI platform (750) range from small handheld devices, such as handheld computer/mobile telephone (780) to large mainframe systems, such as mainframe computer (782). Examples of handheld computer (780) include personal digital assistants (PDAs), personal entertainment devices, such as MP4 players, portable televisions, and compact disc players. Other examples of information handling systems include pen, or tablet computer (784), laptop, or notebook computer (786), personal computer system (788), and server (790). As shown, the various information handling systems can be networked together using computer network (705). Types of computer network (705) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (790) utilizes nonvolatile data store ($790_A$), and mainframe computer (782) utilizes nonvolatile data store ($782_A$). The nonvolatile data store ($782_A$) can be a component that is external to the various information handling systems or can be internal to one of the information handling systems.

The information handling system employed to support the AI platform (750) may take many forms, some of which are shown in FIG. 7. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 8:
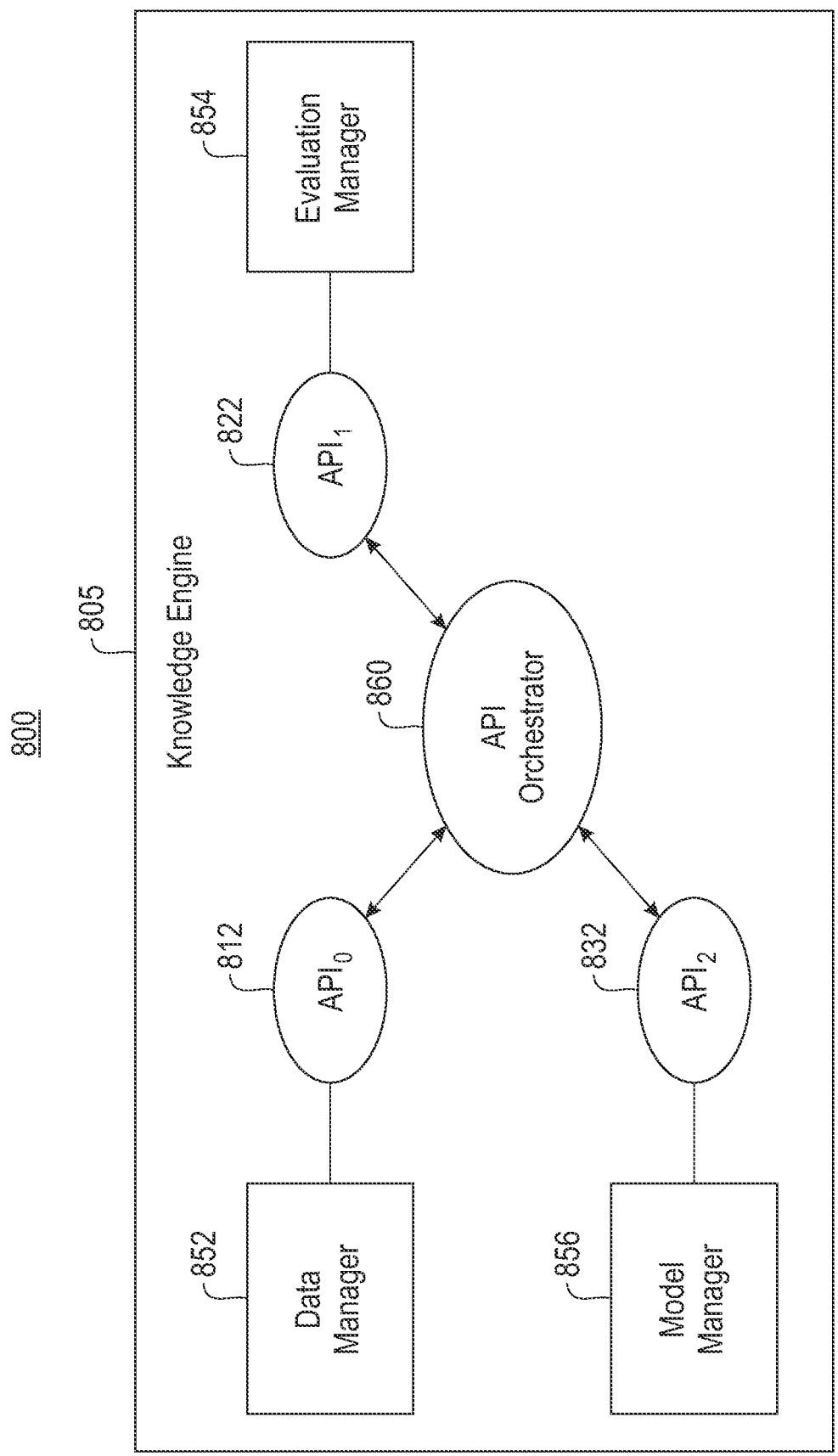
FIG. 8 depicts a block diagram illustrating the artificial intelligence platform and tools, as shown and described in FIG. 7, and their associated application program interfaces.

An Application Program Interface (API) is understood in the art as a software intermediary between two or more applications. With respect to the AI platform (750) shown and described in FIG. 7, one or more APIs may be utilized to support one or more of the tools (752)-(756) and their associated functionality. Referring to FIG. 8, a block diagram (800) is provided illustrating the tools (752)-(756) and their associated APIs. As shown, a plurality of tools are embedded within the AI platform (805), with the tools including the data manager (852) associated with $API_0$ (812), the evaluation manager (854) associated with $API_1$ (822), and the model manager (856) associated with $API_2$ (832). Each of the APIs may be implemented in one or more languages and interface specifications. $API_0$ (812) provides functional support to receive the input data and to apply the input data to a model; $API_1$ (822) provides functional support to evaluate output data generated from the model, including evaluation of accuracy of the output data; and $API_2$ (832) provides functional support to represent the layers of the model as computation graphs, and more specifically to sequentially scan the layers of the model. As shown, each of the APIs (812), (822), and (832) are operatively coupled to an API orchestrator (860), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Aspects of the functional tools (752)-(756) and their associated functionality may be embodied in a computer system/server in a single location, or in one embodiment, may be configured in a cloud based system sharing computing resources. With references to FIG. 9, a block diagram (900) is provided illustrating an example of a computer system/server (902), hereinafter referred to as a host (902) in communication with a cloud based support system, to implement the processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments (980) where tasks are performed by remote processing devices that are linked through a communications network. In a distributed cloud computing environment, program modules may be located in both local and remote computer system storage media including memory storage devices.

Figure 9:
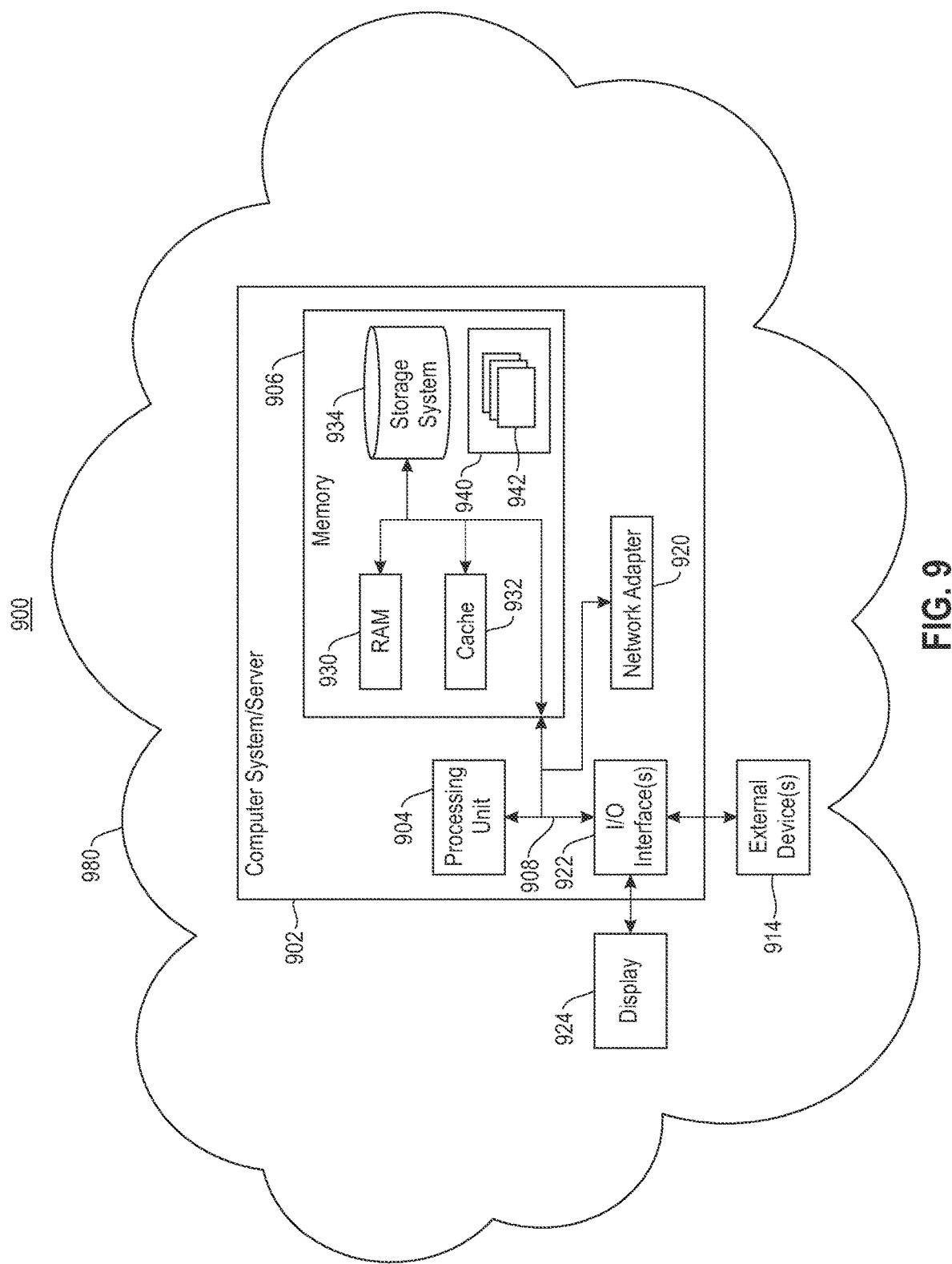
FIG. 9 depicts a block diagram illustrating an example of a computer system/server of a cloud based support system, to implement the system and processes described above with respect to FIGS. 1-8.

As shown in FIG. 9, host (902) is shown in the form of a general-purpose computing device. The components of host (902) may include, but are not limited to, one or more processors or processing units (904), e.g. hardware processors, a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments to dynamically communication evaluation interrogatory identification and processing. For example, the set of program modules (942) may include the tools (752)-(756) as described in FIG. 7.

Host (902) may also communicate with one or more external devices (914), such as a keyboard, a pointing device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
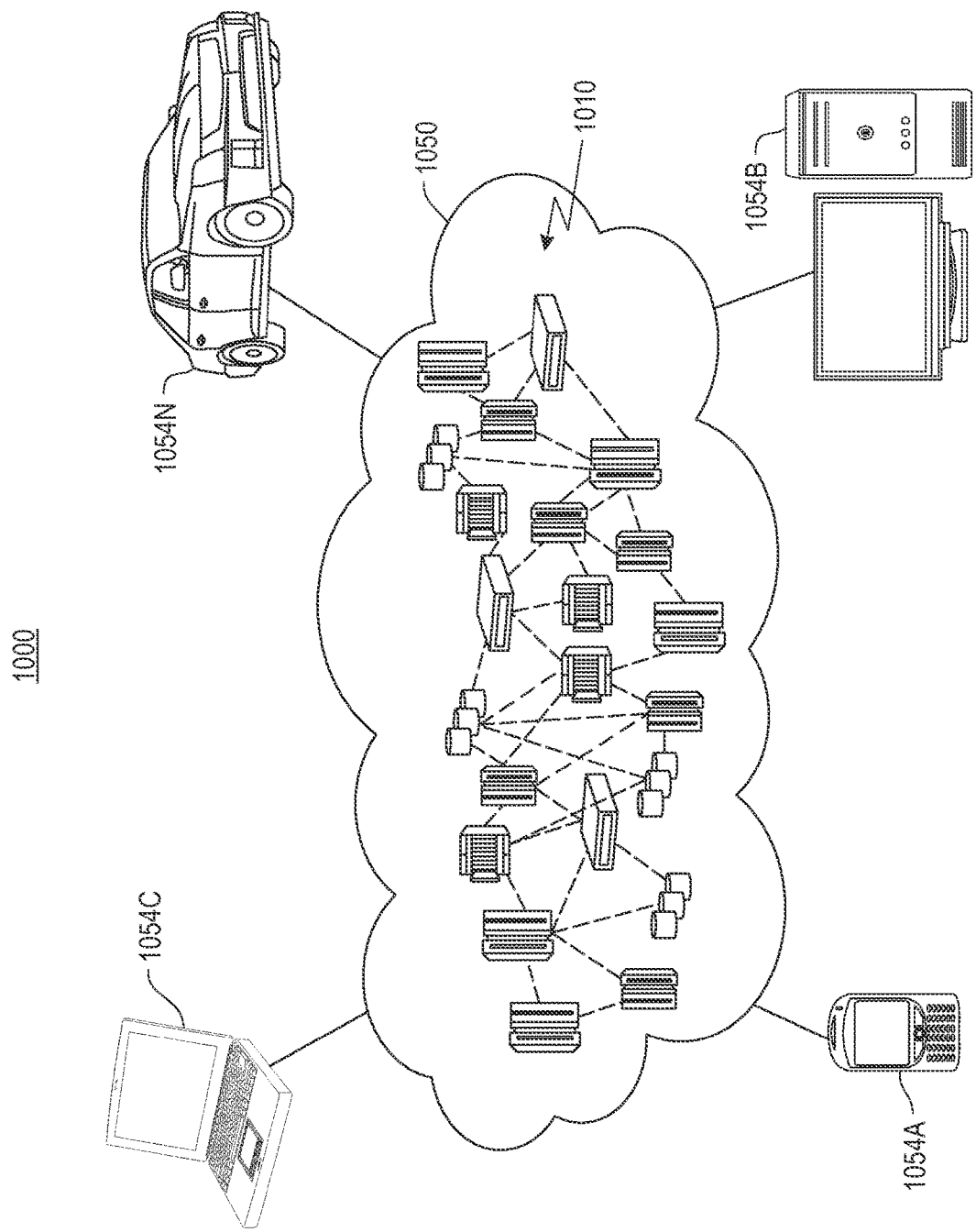
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
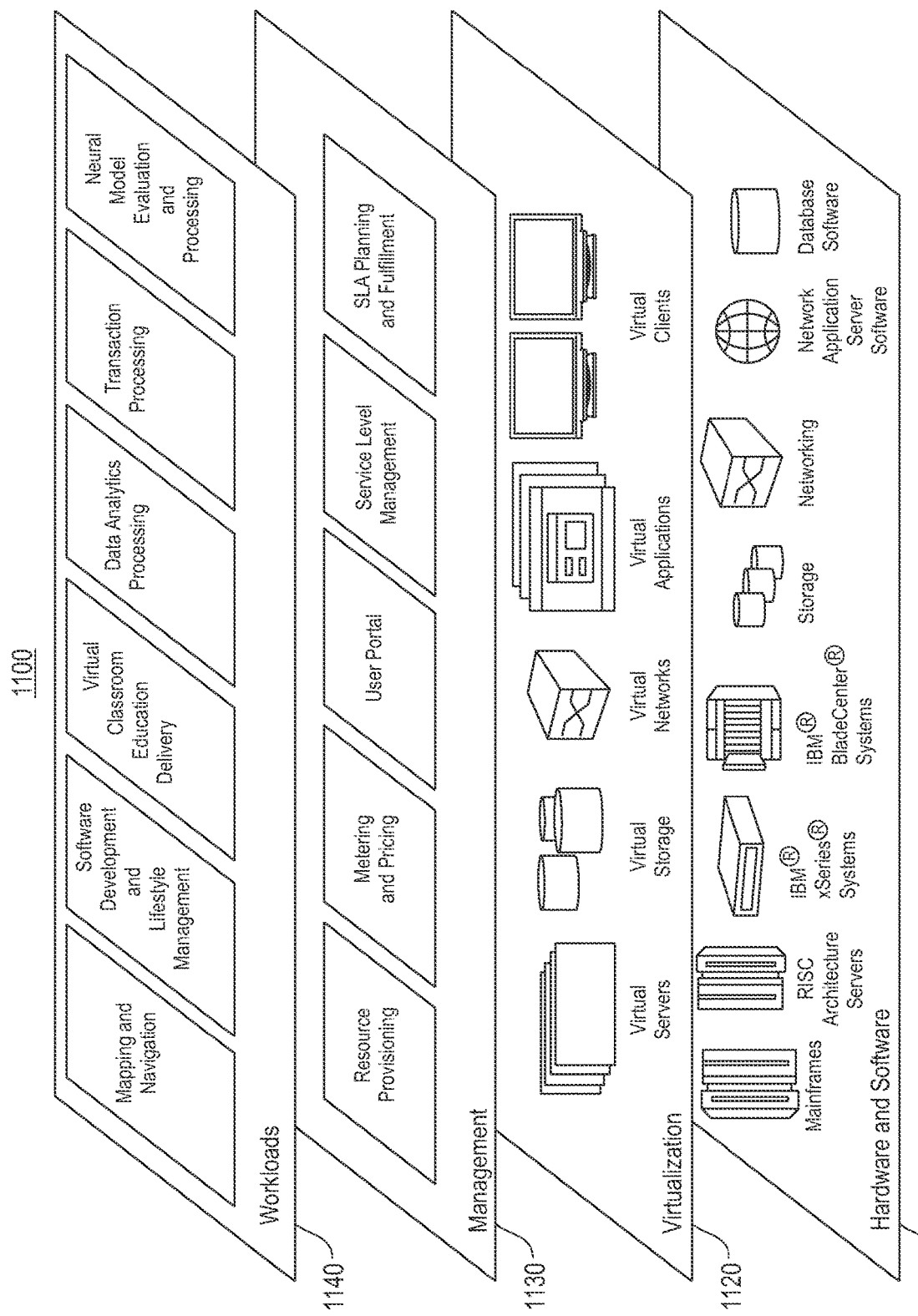
FIG. 11 depicts a block diagram illustrating a set of functional abstraction model layers provided by the cloud computing environment.

Referring now to FIG. 9, a set of functional abstraction layers (900) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140).

The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and neural model evaluation and processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A system comprising:
 a processing unit operatively coupled to memory; and
 an artificial intelligence (AI) platform in communication with the processing unit, the AI platform to evaluate a neural model comprising an input layer, a plurality of successive layers configured perform a series of concatenated functions in a forward order, and an output layer, the plurality of successive layers comprising a first successive layer configured to receive input data from the input layer and a final successive layer configured to deliver output data to the output layer, the AI platform comprising:
  a data manager configured to receive the input data for the neural model and apply the input data to the successive layers of the neural model to perform the series of concatenated functions in a forward order, the neural model configured to generate the output data; and
  an evaluation manager configured to:
   diagnose the generated output data with respect to the neural model via recursive backward deduction of each of the successive layers in a reverse order relative to the forward order, the recursive backward deduction including to identify an output constraint of the final successive layer, deduce an input range of the final successive layer based on the output constraint of the final successive layer, apply the deduced input range of the final successive layer as an output constraint of an upstream successive layer adjacent to the final successive layer, and continue the recursive backward deduction of the successive layers in the reverse order until the recursive backward deduction is performed on the first successive layer;

selectively identify one or more neural model vulnerabilities, the one or more vulnerabilities corresponding to an accuracy of the output data accuracy; and generate an explanation of the selectively identified one or more vulnerabilities, wherein the explanation is an indicator of alignment of the input data with the output data.

2. The system of claim 1, wherein the evaluation manager is configured to apply deductive reasoning to identify a set of input data ranges aligned with the generated output data.

3. The system of claim 2, wherein application of deductive reasoning further comprises a model manager, operatively coupled to the evaluation manager, configured to represent the neural model as two or more computation graphs, and the model manager configured to sequentially scan layers of the neural model in the reverse order, and for each scanned layer the model manager to identify: an operator, input, and output, and connect the output of a parent computation graph of a parent layer with the input of a child computation graph of a child layer.

4. The system of claim 3, wherein the deductive reasoning further comprises the evaluation manager to assess a candidate data range serving as an output range of an external layer of the neural model, the assessment to evaluate validity of the candidate data range, dominance of the candidate data range, and coverage of the candidate data range.

5. The system of claim 4, wherein the candidate data range is selected from the group consisting of: valid, invalid, and partially valid, and wherein the evaluation manager is configured to tailor the candidate date range for a partially valid data range to a valid set of data ranges.

6. The system of claim 1, wherein the data manager is further configured to apply exemplary input data to the neural model, and the generated explanation includes a classification of the output data.

7. A computer program product to monitor and evaluate a neural model, the computer program product comprising:
a computer readable storage medium; and
program code embodied with the computer readable storage medium, the program code executable by a processor to evaluate a neural model comprising an input layer, a plurality of successive layers configured perform a series of concatenated functions in a forward order, and an output layer, the plurality of successive layers comprising a first successive layer configured to receive input data from the input layer and a final successive layer configured to deliver output data to the output layer:

receive the input data for the neural model and apply the input data to the successive layers of the neural model to perform the series of concatenated functions in a forward order, the neural model configured to generate the output data;

diagnose the generated output data with respect to the neural model via recursive backward deduction of each of the successive layers in a reverse order relative to the forward order, including identify an output constraint of the final successive layer, deduce an input range of the final successive layer based on the output constraint of the final successive layer, apply the deduced input range of the final successive layer as an output constraint of an upstream successive layer adjacent to the final successive layer, and continue the recursive backward deduction of the successive layers in the reverse order until the recursive backward deduction is performed on the first successive layer;

selectively identify one or more neural model vulnerabilities, the one or more vulnerabilities corresponding to an accuracy of the output data accuracy; and generate an explanation of the selectively identified one or more vulnerabilities, wherein the explanation is an indicator of alignment of the input data with the output data.

8. The computer program product of claim 7, further comprising program code executable by the processor to apply deductive reasoning to identify a set of input data ranges aligned with the generated output data.

9. The computer program product of claim 8, wherein application of deductive reasoning further comprises program code executable by the processor to represent the neural model as two or more computation graphs, and sequentially scan layers of the neural model in the reverse order, and for each scanned layer the model manager to identify: an operator, input, and output, and connect the output of a parent computation graph of a parent layer with the input of a child computation graph of a child layer.

10. The computer program product of claim 9, further comprising program code executable by the processor to assess a candidate data range serving as an output range of an external layer of the neural model, the assessment including program code to evaluate validity of the candidate data range, dominance of the candidate data range, and coverage of the candidate data range.

11. The computer program product of claim 10, wherein the candidate data range is selected from the group consisting of: valid, invalid, and partially valid, and further comprising program code executable by the processor to tailor the candidate date range for a partially valid data range to a valid set of data ranges.

12. The computer program product of claim 7, further comprising program code executable by the processor to apply exemplary input data to the neural mode, and the generated explanation includes a classification of the output data.

13. A method comprising:
providing a neural model comprising an input layer, a plurality of successive layers configured to perform a series of concatenated functions in a forward order, and output layer, the plurality of successive layers comprising a first successive layer configured to receive input from the input layer and a final successive layer configured to deliver output data to the output layer, the plurality of successive layers comprising a first successive layer configured to receive input from the input layer and a final successive layer configured to deliver output data to the output layer;

receiving the input data for the neural model and applying the input data to the successive layers of the neural model to perform the series of concatenated functions in a forward order, the neural model generating the output data;

diagnosing the generated output data with respect to the neural model via recursive backward deduction of each of the successive layers in a reverse order relative to the forward order, including evaluating accuracy of the output data identifying an output constrain of the final successive layer, deducing an input range of the final successive layer based on the output constraint of the final successive layer, applying the deduced input range of the final successive layer as an output constrain of an upstream successive layer adjacent to the final successive layer, and continuing the recursive backward deducing of the successive layers in the reverse order until the recursive backward deduction is performed on the first successive layer;

selectively identifying one or more neural model vulnerabilities corresponding to an accuracy of the output data; and generating an explanation of the selectively identified one or more vulnerabilities, wherein the explanation is an indicator of alignment of the input data with the output data.

14. The method of claim 13, wherein diagnosing the generated output data further comprises applying deductive reasoning to identify a set of input data ranges aligning with the generated output data.

15. The method of claim 14, wherein applying deductive reasoning further comprises representing the neural model as two or more computation graphs, including sequential scanning layers of the neural model in the reverse order, for each scanned layer identifying: an operator, input, and output, and connecting the output of a parent computation graph of a parent layer with the input of a child computation graph of a child layer.

16. The method of claim 15, wherein the deductive reasoning further comprises assessing a candidate data range serving as an output range of an external layer of the neural model, the assessing evaluating validity of the candidate data range, dominance of the candidate data range, and coverage of the candidate data range.

17. The method of claim 16, wherein the candidate data range is selected from the group consisting of: valid, invalid, and partially valid, and further comprising tailoring the candidate date range for a partially valid data range to a valid set of data ranges.

18. The method of claim 13, further comprising applying exemplary input data to the neural mode, and the generated explanation includes a classification of the output data.

* * * * *